US012325229B2

(12) United States Patent
Ueno

(10) Patent No.: US 12,325,229 B2
(45) Date of Patent: Jun. 10, 2025

(54) BELT CONVEYOR DEVICE AND IMAGE FORMING APPARATUS

(71) Applicant: KYOCERA Document Solutions Inc., Osaka (JP)

(72) Inventor: Daijiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 92 days.

(21) Appl. No.: 18/452,962

(22) Filed: Aug. 21, 2023

(65) Prior Publication Data

US 2024/0066895 A1 Feb. 29, 2024

(30) Foreign Application Priority Data

Aug. 30, 2022 (JP) ................................ 2022-136424

(51) Int. Cl.
*B41J 11/00* (2006.01)

(52) U.S. Cl.
CPC .......... *B41J 11/007* (2013.01); *B41J 11/0085* (2013.01)

(58) Field of Classification Search
CPC ............................ B41J 11/007; B41J 11/0085
See application file for complete search history.

(56) References Cited

U.S. PATENT DOCUMENTS

2010/0149242 A1 6/2010 Takahashi et al.
2016/0129712 A1 * 5/2016 Yoshinaga .............. B41J 29/17 347/101

FOREIGN PATENT DOCUMENTS

JP 2010054855 A * 3/2010
JP 2010137477 A 6/2010

* cited by examiner

*Primary Examiner* — Douglas X Rodriguez
*Assistant Examiner* — Tracey M McMillion
(74) *Attorney, Agent, or Firm* — Alleman Hall & Tuttle LLP

(57) ABSTRACT

A plurality of support rollers rotatably support a belt member. A first motor and a second motor each rotate one of the plurality of support rollers. A first control portion acquires a speed detection value, which is a detection value of a rotational speed of one of the plurality of support rollers, and controls a first supply power supplied to the first motor in accordance with a difference between the speed detection value and a target speed. A second control portion controls a second supply power supplied to the second motor in accordance with one or both of conveyance information on a conveyance state of an object in a specific area and suction force information on a suction force of a suction fan.

5 Claims, 6 Drawing Sheets

BELT CONVEYOR DEVICE AND IMAGE FORMING APPARATUS

INCORPORATION BY REFERENCE

This application is based upon and claims the benefit of priority from the corresponding Japanese Patent Application No. 2022-136424 filed on Aug. 30, 2022, the entire contents of which are incorporated herein by reference.

BACKGROUND

The present disclosure relates to a suction type belt conveyor device and an image forming apparatus comprising the same.

The image forming apparatus includes a sheet conveying device and a printing device. The sheet conveying device conveys a sheet, and the printing device forms an image on the conveyed sheet.

The sheet conveying device may include a suction type belt conveyor device. The belt conveyor device includes a ventilatable conveyor belt and a suction fan. The suction fan generates a suction pressure for sucking the sheet to an outer surface of the conveyor belt.

The conveyor belt is rotatably supported by a plurality of support rollers. The belt conveyor device includes a motor configured to rotate a drive roller which is one of the plurality of support rollers.

The motor rotates the drive roller at a constant speed to rotate the conveyor belt at a constant speed.

SUMMARY

A belt conveyor device according to one aspect of the present disclosure includes an endless belt member, a plurality of support rollers, a first motor, a second motor, a belt support, a suction fan, a first control portion, and a second control portion. The belt member is ventilatable, disposed such that a part of the belt member is along a specific area, and configured to convey one or more objects along the specific area by rotating. The plurality of support rollers rotatably support the belt member. The first motor rotates one of the plurality of support rollers. The second motor rotates one of the plurality of support rollers. The belt support is ventilatable and disposed along an inner surface of the part of the belt member which is along the specific area. The suction fan generates a suction pressure for sucking the objects to an outer surface of the part of the belt member which is along the specific area. The first control portion acquires a speed detection value, which is a detection value of a rotational speed of one of the plurality of support rollers, and controls a first supply power supplied to the first motor in accordance with a difference between the speed detection value and a target speed. The second control portion controls a second supply power supplied to the second motor in accordance with one or both of conveyance information on a conveyance state of the objects in the specific area and suction force information on a suction force of the suction fan.

An image forming apparatus according to another aspect of the present disclosure includes the belt conveyor device and a printing device. The printing device forms an image on a sheet conveyed by the belt conveyor device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings. It is noted that the following embodiments are examples of embodying the present disclosure and do not limit the technical scope of the present disclosure.

[First Embodiment: Configuration of Image Forming Apparatus 10]

Figure 1:
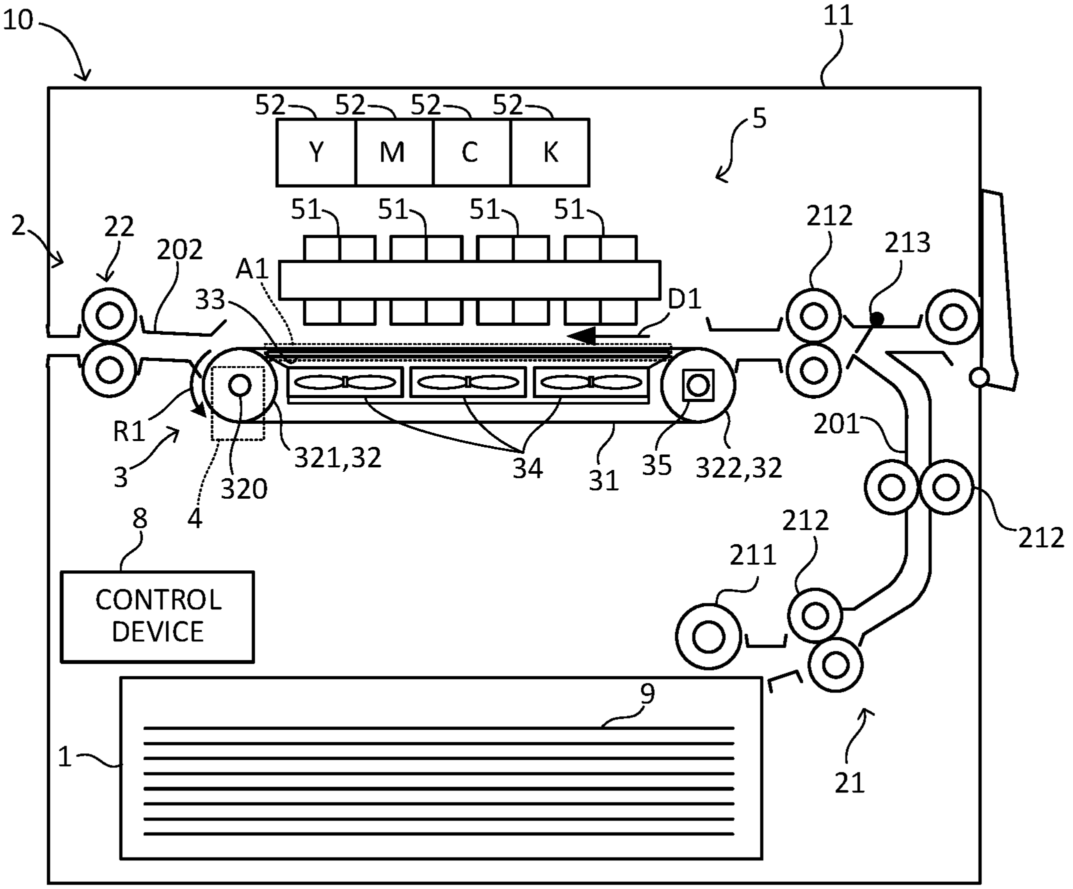
FIG. 1 is a configuration diagram of an image forming apparatus according to a first embodiment.

An image forming apparatus 10 according to the first embodiment includes a sheet storing portion 1, a sheet conveying device 2, and a printing device 5 (see FIG. 1). The sheet conveying device 2 and the printing device 5 are disposed in a main body 11.

Further, the image forming apparatus 10 includes a control device 8 that controls the sheet conveying device 2 and the printing device 5 (see FIG. 1). The control device 8 is part of the sheet conveying device 2 and part of the printing device 5.

The sheet conveying device 2 conveys sheets 9 stored in the sheet storing portion 1 one by one. The sheet conveying device 2 includes a preceding conveying device 21, a belt conveyor device 3, and a subsequent conveying device 22.

The preceding conveying device 21 includes a sheet feeding mechanism 211, one or more primary conveying roller pairs 212, and a sheet detection portion 213.

The sheet feeding mechanism 211 feeds the sheet 9 from the sheet storing portion 1 to a primary conveying path 201. The primary conveying path 201 is a conveying path of the sheet 9 formed between the sheet storing portion 1 and the belt conveyor device 3.

The primary conveying roller pairs 212 convey the sheet 9 along the primary conveying path 201, and further feeds the sheet 9 from the primary conveying path 201 to the belt conveyor device 3.

The sheet detection portion 213 detects the sheet 9 at a specific position of the primary conveying path 201. The detection result of the sheet detection portion 213 is used for controlling the timing of feeding the sheet 9 to the belt conveyor device 3.

The belt conveyor device 3 takes over the conveyance of the sheet 9 from the preceding conveying device 21. The belt conveyor device 3 conveys the sheet 9 along a flat conveying area A1, and further feeds the sheet 9 from the flat conveying area A1 to a secondary conveying path 202.

The flat conveying area A1 is an example of the specific area. The secondary conveying path 202 is a conveying path for the sheet 9 formed in the subsequent stage of the belt conveyor device 3.

The subsequent conveying device 22 takes over the conveyance of the sheet 9 from the belt conveyor device 3. The subsequent conveying device 22 conveys the sheet 9 along the secondary conveying path 202, and further feeds the sheet 9 from the secondary conveying path 202 to a post-stage portion (not shown). For example, the post-stage portion is a discharge tray, a post-processing device, a relay conveying device, or the like.

The printing device 5 executes print processing. The print processing is processing for forming an image on the sheet 9 conveyed along the flat conveying area A1. In the example shown in FIG. 1, the printing device 5 executes the print processing using an inkjet method.

In the example shown in FIG. 1, the printing device 5 includes a plurality of inkjet units 51 corresponding to a plurality of colors, respectively, and a plurality of ink supply portions 52.

The plurality of ink supply portions 52 supply ink to the plurality of inkjet units 51, respectively. The plurality of inkjet units 51 form an image on the sheet 9 by ejecting ink onto the sheet 9.

[Configuration (1) of Belt Conveyor Device 3]

The belt conveyor device 3 is a suction type conveyor device. The belt conveyor device 3 includes a conveyor belt 31, a plurality of support rollers 32, a conveyor plate 33, one or more suction fans 34, a rotational speed detection portion 35, and a roller drive mechanism 4.

The conveyor belt 31 is an endless belt member in which a plurality of ventilation holes are formed. The conveyor belt 31 can be ventilated by having the plurality of ventilation holes. The conveyor belt 31 is disposed such that a part thereof is along the flat conveying area A1.

The conveyor belt 31 is rotatably supported by the plurality of support rollers 32. The conveyor belt 31 can convey one or more sheets 9 along the flat conveying area A1 by rotating. The sheet 9 is an example of the object to be conveyed.

The belt conveying direction D1 shown in FIG. 1 is a moving direction of the conveyor belt 31 in the flat conveying area A1. The belt conveyor device 3 conveys one or more sheets 9 in the belt conveying direction D1 along the flat conveying area A1.

The plurality of support rollers 32 rotatably support the conveyor belt 31. The plurality of support rollers 32 include one or more drive rollers 321 and one or more driven rollers 322.

In the example shown in FIG. 1, the belt conveyor device 3 includes one drive roller 321 and one driven roller 322. The drive roller 321 is disposed downstream of the flat conveying area A1 in the belt conveying direction D1.

The roller drive mechanism 4 rotates the drive roller 321 in a predetermined direction. As the drive roller 321 rotates, the conveyor belt 31 rotates in a belt rotation direction R1.

The roller drive mechanism 4 rotates the drive roller 321 at a constant speed. Thus, the conveyor belt 31 rotates at a constant speed.

The conveyor plate 33 is a plate-like member in which a plurality of openings are formed. The conveyor plate 33 can be ventilated by having the plurality of openings. The conveyor plate 33 is disposed along the inner surface of the part of the conveyor belt 31 which is along the flat conveying area A1. The conveyor plate 33 is an example of the belt support.

The suction fan 34 is disposed to face the conveyor plate 33 inside the conveyor belt 31. The suction fan 34 sucks air from an air supply port facing the conveyor plate 33. Thus, the suction fan 34 generates an air flow from the outside of the conveyor belt 31 toward the inside of the conveyor belt 31 through the conveyor plate 33.

The suction fan 34 generates a suction pressure on the outer surface of the part of the conveyor belt 31 which is along the flat conveying area A1. The suction pressure is a wind pressure for sucking the sheet 9 onto the surface of the conveyor belt 31.

One or more sheets 9 present in the flat conveying area A1 are attracted to the outer surface of the conveyor belt 31 by the suction pressure. As a result, one or more sheets 9 move in the belt conveying direction D1 together with the conveyor belt 31.

The rotational speed detection portion 35 detects the rotational speed of one of the plurality of support rollers 32. In the example shown in FIG. 1, the rotational speed detection portion 35 detects the rotational speed of the driven roller 322. It is noted that the rotational speed detection portion 35 may detect the rotational speed of the drive roller 321.

[Configuration of Control Device 8]

The control device 8 includes a central processing unit (CPU) 81, a random access memory (RAM) 82, a secondary storage device 83, a signal interface 84, a communication device 85, a motor drive circuit 86, a fan drive circuit 87, and the like.

The secondary storage device 83 is a computer-readable nonvolatile storage device. The secondary storage device 83 can store and update computer programs and various types of data. For example, one or both of a flash memory and a hard disk drive are employed as the secondary storage device 83.

The signal interface 84 converts signals output from various sensors into digital data, and transmits the converted digital data to the CPU 81. Further, the signal interface 84 converts control commands output from the CPU 81 into control signals, and transmits the control signals to devices to be controlled.

The communication device 85 executes communication with other devices such as a host device (not shown). The CPU 81 communicates with the other devices through the communication device 85.

The motor drive circuit 86 supplies power to one or more motors included in the roller drive mechanism 4 in accordance with an input motor control signal. The motor control signal is an example of the control signals.

The fan drive circuit 87 supplies power to the suction fan 34 in accordance with a fan control signal which is one of the control signals.

The CPU 81 is a processor that executes various types of data processing and control by executing the computer programs. The control device 8 including the CPU 81 controls the sheet conveying device 2, the printing device 5, and the like.

The RAM 82 is a computer-readable volatile storage device. The RAM 82 temporarily stores the computer programs executed by the CPU 81 and data output and referred to while the CPU 81 is executing various types of processing.

The CPU 81 includes a plurality of processing modules implemented by executing the computer programs. The processing modules include a main processing portion 8*a*, a conveyance control portion 8*b*, a print control portion 8*c*, and the like.

The main processing portion 8*a* executes processing for starting various types of processing in response to occurrence of various processing events, control of a display portion (not shown), and the like. The processing events include an operation event, a reception event, and the like.

The operation event is an event in which an operation on an operation portion (not shown) is detected. The reception event is an event in which various processing requests are received through the communication device 85. The processing request includes a print request for requesting execution of the print processing.

The conveyance control portion 8*b* controls the preceding conveying device 21, the belt conveyor device 3, and the subsequent conveying device 22.

The conveyance control portion 8*b* controls the sheet conveying device 2 to control the conveyance of the sheet 9 in the primary conveying path 201, the flat conveying area A1, and the secondary conveying path 202. The conveyance control portion 8*b* controls the timing of feeding the sheet 9 to the belt conveyor device 3 in accordance with the detection state of the sheet 9 by the sheet detection portion 213.

The print control portion 8*c* controls the printing device 5. The print control portion 8*c* causes the printing device 5 to execute the print processing in synchronization with the conveyance of the sheet 9 by the sheet conveying device 2.

For example, when the print request is received by the communication device 85, the conveyance control portion 8*b* causes the sheet conveying device 2 to convey the sheet 9, and the print control portion 8*c* causes the printing device 5 to execute the print processing.

By the way, the load torque of the plurality of support rollers 32 changes. For example, the load torque changes in accordance with changes in the total area of one or more sheets 9 present on the conveyor belt 31, changes in the suction force of the suction fan 34, and the like.

Accordingly, the power supplied to the motor is regulated by speed feedback control by the control device 8. The speed feedback control is power control according to the difference between the detection value of the rotational speed detection portion 35 and a target speed. Thus, the conveyor belt 31 rotates at a constant speed.

Meantime, when the load torque is large in the belt conveyor device 3, a motor having a large output is required. However, it may be less costly to employ a plurality of small output motors than to employ a single large power motor.

Figure 3:
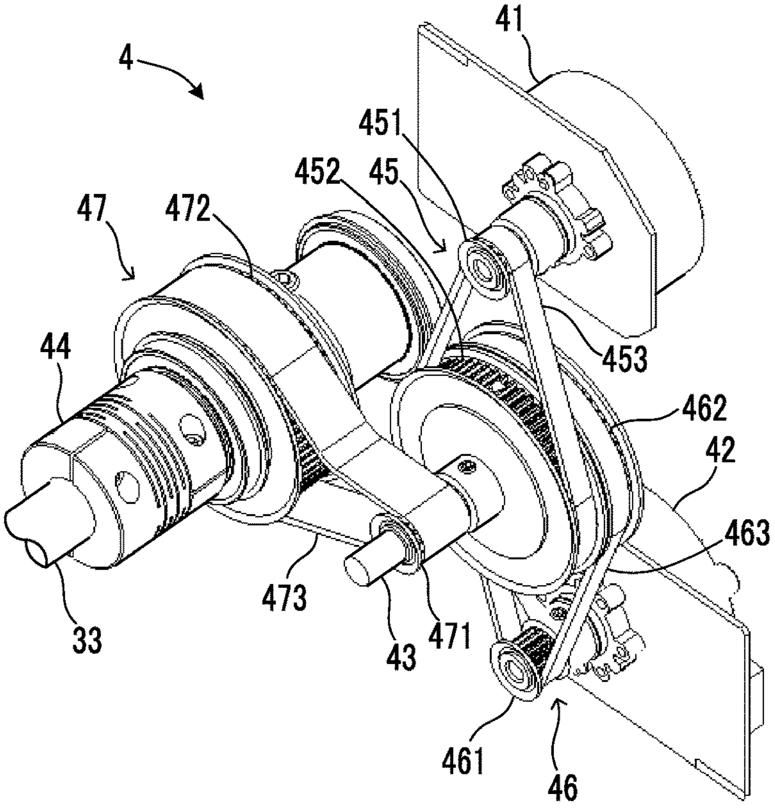
FIG. 3 is a perspective view of a belt drive mechanism in the image forming apparatus according to the first embodiment.

In the present embodiment, the roller drive mechanism 4 of the belt conveyor device 3 includes two motors 41 and 42 as drive sources (see FIG. 3).

When two motors 41 and 42 are employed in the belt conveyor device 3, it is conceivable that the power supplied to each of the two motors 41 and 42 is regulated by the speed feedback control. In this case, the change in the power supplied to one of the two motors 41 and 42 acts as a disturbance for the other to change the load torque.

Therefore, when the power supplied to each of the two motors 41 and 42 is regulated by the speed feedback control, the rotational speed of the conveyor belt 31 may become unstable.

In addition, the load torque changes with time due to deterioration of the devices included in the belt conveyor device 3. In the belt conveyor device 3, it is important to stably control the rotational speed of the conveyor belt 31 in response to the change in the load torque with time.

The belt conveyor device 3 has a configuration for stably controlling the rotational speed of the conveyor belt 31 driven by the two motors 41 and 42. Hereinafter, the configuration will be described.

[Configuration (2) of Belt Conveyor Device 3]

As described above, the belt conveyor device 3 includes the roller drive mechanism 4 (see FIG. 1 and FIG. 3).

The roller drive mechanism 4 of the belt conveyor device 3 includes a first motor 41, a second motor 42, a relay rotary body 43, an output rotary body 44, a first input mechanism 45, a second input mechanism 46, and an output mechanism 47 (see FIG. 3).

The relay rotary body 43 and the output rotary body 44 are disposed in parallel and are each rotatably supported.

The first input mechanism 45 is a mechanism for transmitting the rotational force of the first motor 41 to the relay rotary body 43. The first input mechanism 45 includes a first motor gear 451, a first relay gear 452, and a first gear belt 453.

The first motor gear 451 is connected to a drive shaft of the first motor 41. The first relay gear 452 is connected to the relay rotary body 43. The first gear belt 453 is a timing belt with a gear formed to mesh with the first motor gear 451 and the first relay gear 452.

The first gear belt 453 transmits the rotation of the first motor gear 451 to the first relay gear 452.

The second input mechanism 46 is a mechanism for transmitting the rotational force of the second motor 42 to the relay rotary body 43. The second input mechanism 46 includes a second motor gear 461, a second relay gear 462, and a second gear belt 463.

The second motor gear 461 is connected to a drive shaft of the second motor 42. The second relay gear 462 is connected to the relay rotary body 43. The second gear belt 463 is a timing belt with a gear formed to mesh with the second motor gear 461 and the second relay gear 462.

The second gear belt 463 transmits the rotation of the second motor gear 461 to the second relay gear 462.

The output mechanism 47 is a mechanism for transmitting the rotational force of the relay rotary body 43 to the output rotary body 44. The output mechanism 47 includes a third relay gear 471, an output gear 472, and a third gear belt 473.

The third relay gear 471 is connected to the relay rotary body 43. The output gear 472 is connected to the output rotary body 44. The third gear belt 473 is a timing belt with a gear formed to mesh with the third relay gear 471 and the output gear 472.

The third gear belt 473 transmits the rotation of the third relay gear 471 to the output gear 472.

The output rotary body 44 is connected to a rotary shaft 320 of the drive roller 321. Therefore, the rotational forces of the first motor 41 and the second motor 42 are transmitted to the drive roller 321 via the relay rotary body 43 and the output rotary body 44.

As described above, the first motor 41 and the second motor 42 rotate the drive roller 321, which is one of the plurality of support rollers 32.

In the present embodiment, the first input mechanism 45, the relay rotary body 43, the output mechanism 47, and the output rotary body 44 are an example of a first transmission mechanism for transmitting the rotational force of the first motor 41 to the drive roller 321.

In addition, the second input mechanism 46, the relay rotary body 43, the output mechanism 47, and the output rotary body 44 are an example of a second transmission mechanism for transmitting the rotational force of the second motor 42 to the drive roller 321. In the present embodiment, the relay rotary body 43, the output mechanism 47, and the output rotary body 44 are shared by the first transmission mechanism and the second transmission mechanism.

In the present embodiment, the speed reduction ratio of the second input mechanism 46 is greater than that of the first input mechanism 45. That is, the second transmission mechanism transmits the rotational force at a greater reduction ratio than the first transmission mechanism.

Figure 2:
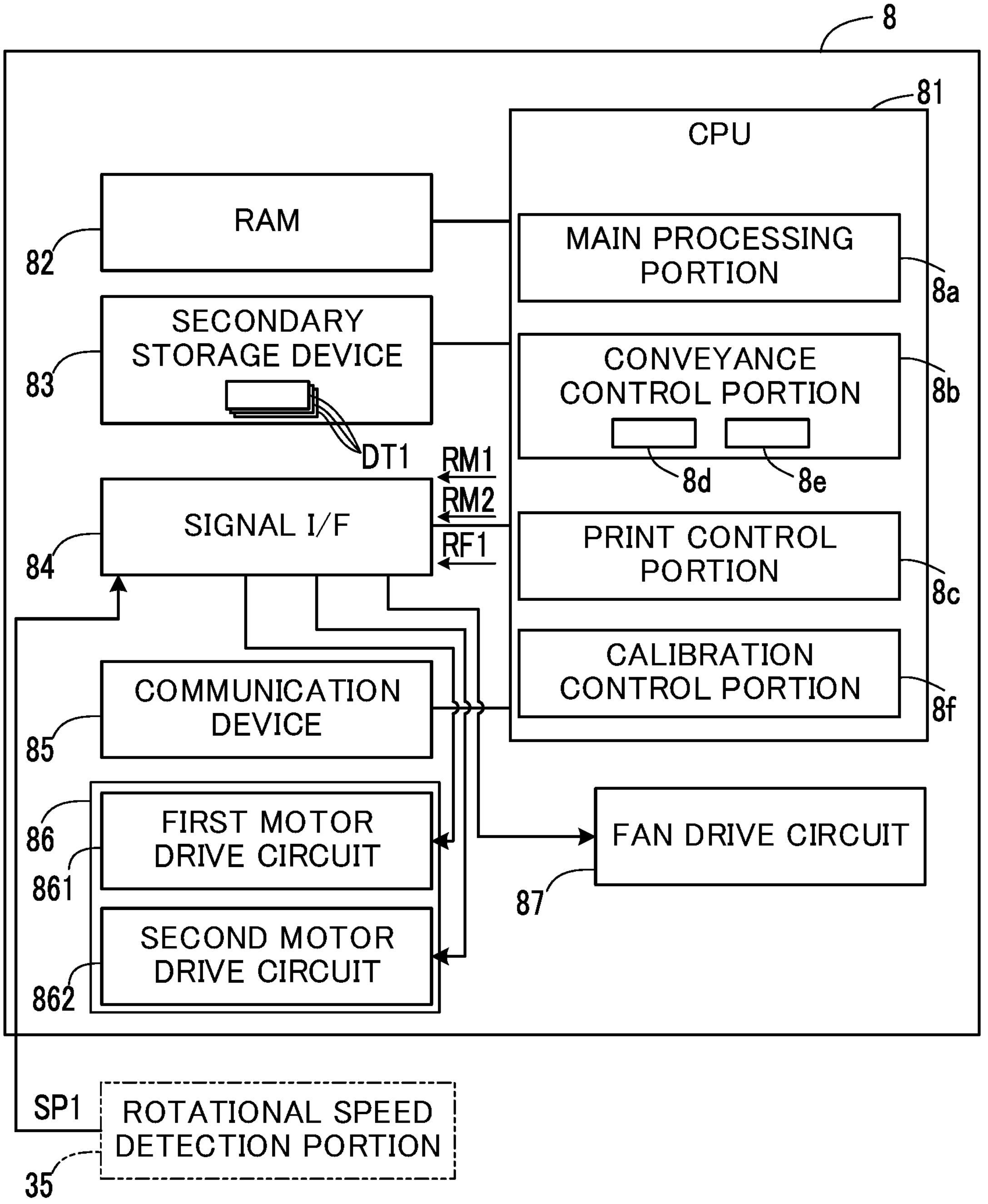
FIG. 2 is a block diagram showing a configuration of a control device in the image forming apparatus according to the first embodiment.

The conveyance control portion **8*b* includes a first control portion 8*d* and a second control portion 8*e* (see FIG. 2). The first control portion 8*d* and the second control portion 8*e* form part of the belt conveyor device 3**.

The first control portion **8*d* controls first supply power by the speed feedback control. The first supply power is power supplied to the first motor 41**.

In the speed feedback control, the first control portion **8*d* acquires a speed detection value SP1 from the rotational speed detection portion 35 (see FIG. 2). The speed detection value SP1 is a detection value of the rotational speed of the drive roller 321**.

Further, the first control portion **8*d* controls the first supply power in accordance with a difference between the speed detection value SP1** and a preset target speed.

In the present embodiment, the first control portion **8*d* sets a first duty ratio RM1 in accordance with the difference between the speed detection value SP1 and the target speed. The first control portion 8*d* outputs a first motor control signal representing the first duty ratio RM1 to the first motor drive circuit 861 through the signal interface 84**.

The first motor drive circuit 861 supplies a pulse width modulation (PWM) signal of the first duty ratio RM1 to the first motor 41 as a drive signal. Thus, power proportional to the first duty ratio RM1 is supplied to the first motor 41. The first duty ratio RM1 is a control value representing the first supply power.

The second control portion **8*e* acquires sheet detection information which is a result of detection of the sheet 9 by the sheet detection portion 213. Further, the second control portion 8*e* identifies the number of conveyed sheets, which is the number of sheets 9 present in the flat conveying area A1**, based on the sheet detection information.

Further, the second control portion **8*e* controls fan power, which is power supplied to the suction fan 34 in accordance with the number of conveyed sheets. In the present embodiment, the second control portion 8*e* sets a fan duty ratio RF1 in accordance with the number of conveyed sheets (see FIG. 2**).

The second control portion **8*e* outputs a fan control signal representing the fan duty ratio RF1 to the fan drive circuit 87 through the signal interface 84**.

The fan drive circuit 87 supplies a PWM signal of the fan duty ratio RF1 to the suction fan 34 as a drive signal. Thus, power proportional to the fan duty ratio RF1 is supplied to the suction fan 34.

For example, the second control portion **8*e* selects the fan duty ratio RF1** from a plurality of duty ratio candidates in accordance with which of a plurality of predetermined sheet number brackets the number of conveyed sheets corresponds to.

It is noted that the fan duty ratio RF1 is an example of suction force information on the suction force of the suction fan 34. The fan duty ratio RF1 is also a control value representing the power supplied to the suction fan 34.

Further, the second control portion **8*e* acquires preset sheet size information from the secondary storage device 83. The sheet size information is information on the size of the sheet 9 stored in the sheet storing portion 1. For example, the sheet size information is set in response to an information input operation to an operation portion (not shown) or in response to reception of size information by the communication device 85**.

Figure 4:
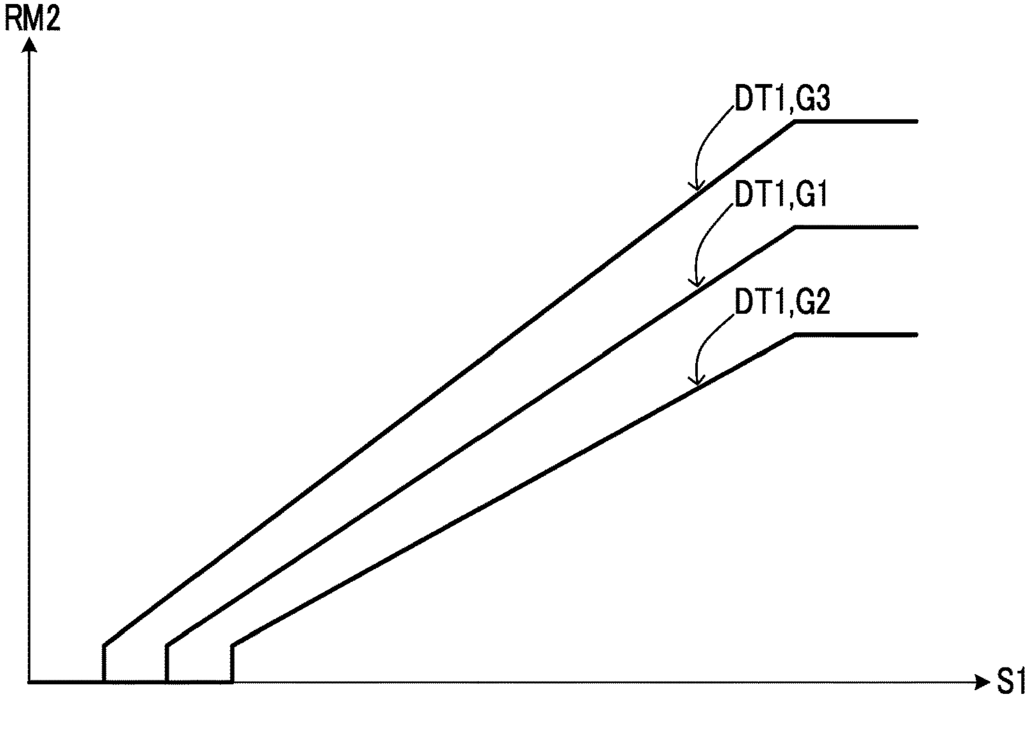
FIG. 4 is a diagram showing an example of the contents of power control data in the image forming apparatus according to the first embodiment.

Further, the second control portion **8*e* derives a conveyed sheet area S1 based on the number of conveyed sheets and the sheet size information (see FIG. 4). The conveyed sheet area S1 is the total area occupied by the sheets 9 in the flat conveying area A1**.

It is noted that the sheet detection information and the sheet size information are examples of conveyance information on the conveyance state of the sheet 9 in the flat conveying area A1.

Further, the second control portion **8*e* acquires the fan duty ratio RF1, and controls second supply power in accordance with the fan duty ratio RF1 and the conveyed sheet area S1. The second supply power is power supplied to the second motor 42**.

The second control portion **8*e* outputs a second motor control signal representing the second duty ratio RM2 to the second motor drive circuit 862 through the signal interface 84**.

The second motor drive circuit 862 supplies a PWM signal of the second duty ratio RM2 to the second motor 42 as a drive signal. Thus, power proportional to the second duty ratio RM2 is supplied to the second motor 42. The second duty ratio RM2 is a control value representing the second supply power.

In the present embodiment, a plurality of candidates of power control data DT1 are stored in advance in the secondary storage device 83. The plurality of candidates of the power control data DT1 each represent the correspondence between the conveyed sheet area S1 and the second duty ratio RM2 (see FIG. 4).

The plurality of candidates of the power control data DT1 are associated with a plurality of candidates of the second duty ratio RM2. In FIG. 4, a first graph G1 shows power control data DT1 corresponding to a reference duty ratio. A second graph G2 shows power control data DT1 corresponding to a small duty ratio smaller than the reference duty ratio. A third graph G3 shows power control data DT1 corresponding to a large duty ratio larger than the reference duty ratio.

The second control portion **8*e* selects target control data corresponding to the fan duty ratio RF1 from the plurality of candidates of the power control data DT1. Further, the second control portion 8*e* sets the second duty ratio RM2 based on the conveyed sheet area S1** and the target control data.

In the belt conveyor device 3, the conveyed sheet area S1 and the load torque of the plurality of support rollers 32 have a positive correlation. Similarly, the fan duty ratio RF1 and the load torque have a positive correlation.

Therefore, the sheet detection information and the sheet size information used for deriving the conveyed sheet area S1 are examples of information on the load torque. Similarly, the fan duty ratio RF1 is also an example of the information on the load torque. In addition, the conveyed sheet area S1 is an example of a load index value corresponding to the load torque.

In the present embodiment, the first supply power supplied to the first motor 41 is controlled by the speed feedback control. On the other hand, the second supply power supplied to the second motor 42 is controlled in accordance with the load index value corresponding to the load torque.

According to the present embodiment, the second motor 42 is controlled in response to a large change in the load torque, and the first motor 41 is controlled in response to a change in the rotational speed of the conveyor belt 31. As a result, the rotational speed of the conveyor belt 31 can be stably controlled.

In addition, the rotation of the second motor 42 is transmitted to the drive roller 321 at a larger reduction ratio than the rotation of the first motor 41.

Accordingly, the driving force of the second motor 42 is gently adjusted in response to a large change in the load torque. On the other hand, the driving force of the first motor 41 is quickly adjusted in response to a change in the rotational speed of the conveyor belt 31. As a result, the control of the two motors 41 and 42 is stabilized.

The control by the first control portion 8*d* and the second control portion 8*e* described above is control in the normal mode. The first control portion 8*d* and the second control portion 8*e* of the conveyance control portion 8*b* are an example of a normal control portion.

The CPU 81 can operate in a calibration mode in order to cope with a change in the load torque with time in the belt conveyor device 3.

The plurality of processing modules of the CPU 81 further include a calibration control portion 8*f* (see FIG. 2). The calibration control portion 8*f* executes control data calibration processing in the calibration mode (see FIG. 5 and FIG. 6). The control data calibration processing is executed to cope with a change in the load torque with time. The calibration control portion 8*f* controls the second supply power in the control data calibration processing.

For example, the main processing portion 8*a* shifts the control mode from the normal mode to the calibration mode when a calibration start condition is satisfied. For example, the calibration start condition includes one or both of a first calibration start condition and a second calibration start condition.

The first calibration start condition is a condition that a calibration start operation to an operation device (not shown) is detected. The operation device is a device that receives a human operation.

The second calibration start condition is a condition that the number of times the print processing has been executed after the previous control data calibration processing is executed exceeds a predetermined reference number of times and that the print request has not been received.

Figure 5:
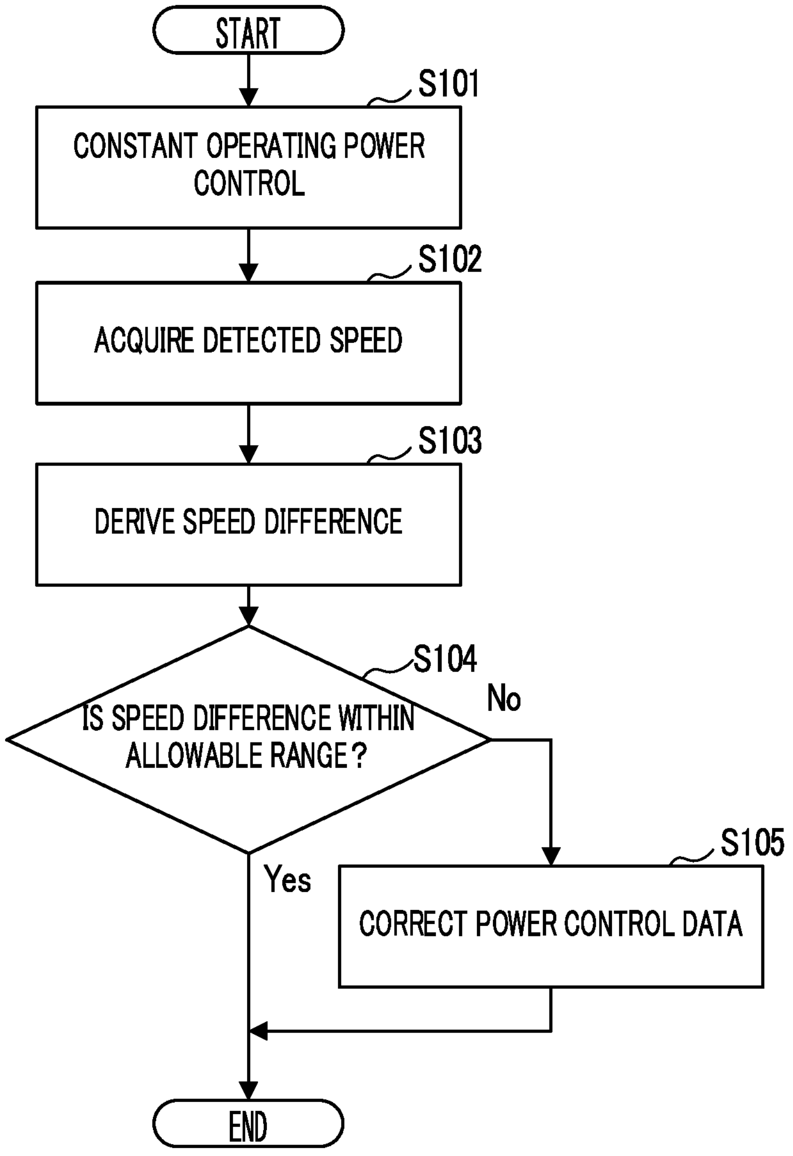
FIG. 5 is a flowchart showing a first example procedure of control data calibration processing in the image forming apparatus according to the first embodiment.
Figure 6:
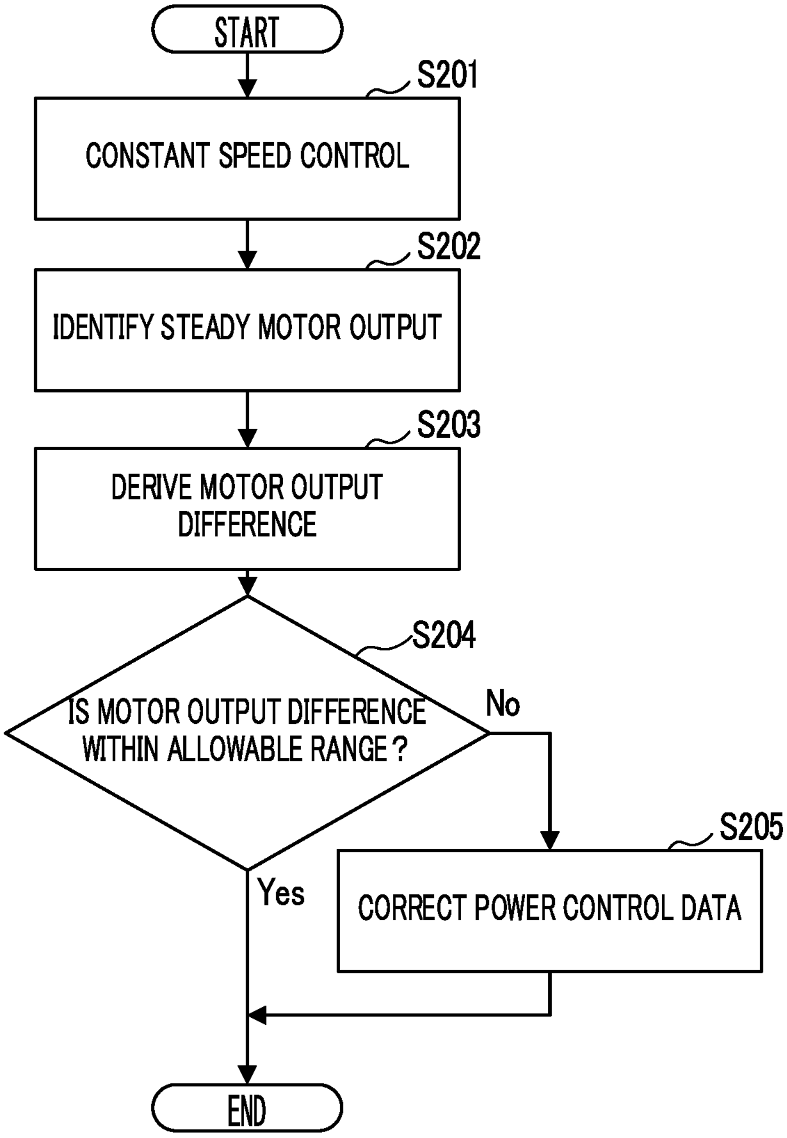
FIG. 6 is a flowchart showing a second example procedure of the control data calibration processing in the image forming apparatus according to the first embodiment.

In the calibration mode, the calibration control portion 8*f* executes first calibration processing or second calibration processing as the control data calibration processing. FIG. 5 is a flowchart showing an example of the procedure of the first calibration processing. FIG. 6 is a flowchart showing an example of the procedure of the second calibration processing.

[First Calibration Processing]

An example of the procedure of the first calibration processing will be described below with reference to the flowchart shown in FIG. 5.

In the following description, S101, S102, . . . represent identification codes of a plurality of steps in the first calibration processing. The calibration control portion 8*f* starts with the process of step S101 in the first calibration processing.

<Step S101>

In step S101, the calibration control portion 8*f* executes a constant operating power control. The constant operating power control is a control for supplying a constant power to each of the second motor 42 and the suction fan 34.

Power is supplied to the suction fan 34 in order to increase the load torque. It is noted that, in the constant operating power control, the supply of power to the first motor 41 is stopped.

The constant operating power control is an example of a test drive control for causing the second motor 42 and the suction fan 34 to perform predetermined operations.

The calibration control portion 8*f* shifts the processing to step S102 while executing the constant operating power control.

<Step S102>

In step S102, the calibration control portion 8*f* acquires the speed detection value SP1 from the rotational speed detection portion 35 under the condition where the constant operating power control is being executed.

The speed detection value SP1 acquired in step S102 is an example of a test actual value obtained when the test drive control is executed.

After acquiring the speed detection value SP1, the calibration control portion 8*f* shifts the processing to step S103.

<Step S103>

In step S103, the calibration control portion 8*f* derives a speed difference which is a difference between the speed detection value SP1 acquired in step S102 and a preset speed reference value.

The speed reference value is a speed detection value SP1 acquired by the constant operating power control in the belt conveyor device 3 at the beginning. The speed difference represents the degree of the change in the load torque with time.

After acquiring the speed difference, the calibration control portion 8*f* shifts the processing to step S104.

<Step S104>

In step S104, the calibration control portion 8*f* determines whether the speed difference is within a preset allowable range or out of the allowable range.

When the calibration control portion 8*f* determines that the speed difference is within the allowable range, the calibration control portion 8*f* terminates the first calibration processing.

On the other hand, when the calibration control portion 8*f* determines that the speed difference is out of the allowable range, the calibration control portion 8*f* shifts the processing to step S105.

<Step S105>

In step S105, the calibration control portion 8*f* corrects the power control data DT1 in accordance with the speed difference. The calibration control portion 8*f* stores the corrected power control data DT1 in the secondary storage device 83.

When the speed detection value SP1 is smaller than the speed reference value, the calibration control portion 8*f* corrects the power control data DT1 so that the second duty ratio RM2 corresponding to the conveyed sheet area S1 becomes larger.

The processes of steps S104 and S105 performed by the calibration control portion 8*f* are an example of processing for correcting the power control data DT1 by comparing the test actual value with a preset reference value.

The calibration control portion 8*f* terminates the first calibration processing after executing the process of step S105. After the power control data DT1 is corrected, the second control portion 8*e* of the conveyance control portion 8*b* controls the second supply power using the corrected power control data DT1.

In the first calibration processing, the calibration control portion 8*f* may execute the processes of steps S101 to S103 a plurality of times by changing the condition of the second duty ratio RM2 and the corresponding speed reference value.

In this case, in step S105, the calibration control portion 8*f* corrects the power control data by integrating a plurality of results acquired by executing the processes of steps S101 to S103 a plurality of times.

For example, the calibration control portion 8*f* may correct the power control data in accordance with a weighted average value of a plurality of speed differences acquired by executing the processes of steps S101 to S103 a plurality of times.

[Second Calibration Processing]

Next, an example of the procedure of the second calibration processing will be described below with reference to the flowchart shown in FIG. 6.

In the following description, S201, S202, . . . represent identification codes of a plurality of steps in the second calibration processing. The calibration control portion 8*f* starts with the process of step S201 in the second calibration processing.

<Step S201>

In step S201, the calibration control portion 8*f* executes a constant speed control. The constant speed control is a control for adjusting the second supply power in accordance with a difference between the speed detection value SP1 and a reference speed while supplying a constant power to the suction fan 34.

Specifically, in the constant speed control, the calibration control portion 8*f* adjusts the second duty ratio RM2 so that the speed detection value SP1 approaches the speed.

Power is supplied to the suction fan 34 in order to increase the load torque. It is noted that, in the constant speed control, the supply of power to the first motor 41 is stopped.

The constant speed control is an example of a test drive control for causing the second motor 42 and the suction fan 34 to perform predetermined operations.

The calibration control portion 8*f* shifts the processing to step S202 while executing the constant speed control.

<Step S202>

In step S202, the calibration control portion 8*f* identifies a steady motor output under the condition where the constant speed control is being executed.

The steady motor output is the second duty ratio RM2 when the difference between the speed detection value SP1 and the reference speed is within the allowable range by the constant speed control.

The steady motor output acquired in step S202 is an example of a test actual value obtained when the test drive control is executed.

After identifying the steady motor output, the calibration control portion 8*f* shifts the processing to step S203.

<Step S203>

In step S203, the calibration control portion 8*f* derives a motor output difference which is a difference between the steady motor output acquired in step S202 and a preset output reference value.

The output reference value is a steady motor output acquired by the speed constant control in the belt conveyor device 3 at the beginning. The motor output difference represents the degree of change in the load torque with time.

After acquiring the motor output difference, the calibration control portion 8*f* shifts the processing to step S204.

<Step S204>

In step S204, the calibration control portion 8*f* determines whether the motor output difference is within a preset allowable range or out of the allowable range.

When the calibration control portion 8*f* determines that the motor output difference is within the allowable range, the calibration control portion 8*f* terminates the second calibration processing.

On the other hand, when the calibration control portion 8*f* determines that the motor output difference is out of the allowable range, the calibration control portion 8*f* shifts the processing to step S205.

<Step S205>

In step S205, the calibration control portion 8*f* corrects the power control data DT1 in accordance with the motor output difference. The calibration control portion 8*f* stores the corrected power control data DT1 in the secondary storage device 83.

When the steady motor output is larger than the output reference value, the calibration control portion 8*f* corrects the power control data DT1 so that the second duty ratio RM2 corresponding to the conveyed sheet area 51 becomes larger.

The processes of steps S204 and S205 performed by the calibration control portion 8*f* are an example of processing for correcting the power control data DT1 by comparing the test actual value with a preset reference value.

The calibration control portion 8*f* terminates the second calibration processing after executing the process of step S205. After the power control data DT1 is corrected, the second control portion 8*e* of the conveyance control portion 8*b* controls the second supply power using the corrected power control data DT1.

In the second calibration processing, the calibration control portion 8*f* may execute the processes of steps S201 to S203 a plurality of times by changing the condition of the reference speed and the corresponding output reference value.

In this case, in step S205, the calibration control portion 8*f* corrects the power control data by integrating a plurality of results acquired by executing the processes of steps S201 to S203 a plurality of times.

For example, the calibration control portion 8*f* may correct the power control data in accordance with a weighted average value of a plurality of motor output differences acquired by executing the processes of steps S201 to S203 a plurality of times.

By executing the first calibration processing or the second calibration processing, the rotational speed of the conveyor belt 31 is stably controlled even when the load torque changes with time.

Second Embodiment

Figure 7:
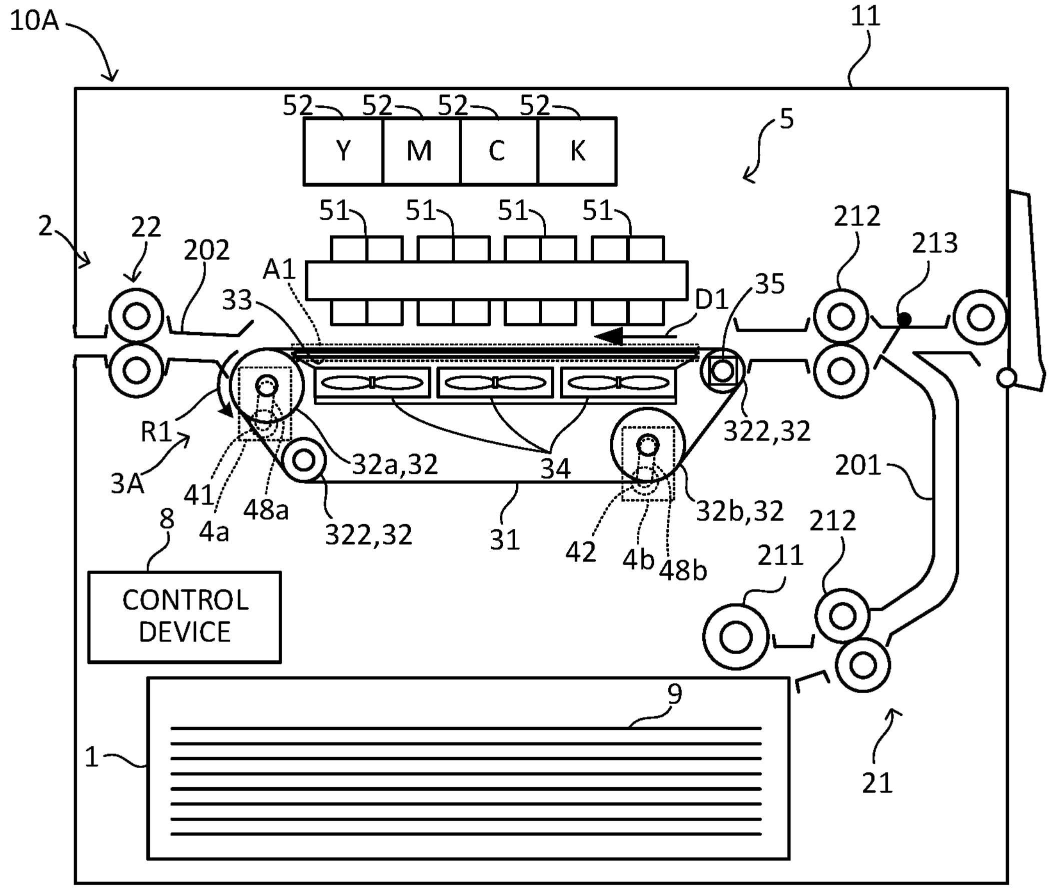
FIG. 7 is a configuration diagram of an image forming apparatus according to a second embodiment.

Next, an image forming apparatus 10A according to a second embodiment will be described with reference to FIG. 7. The differences from the image forming apparatus 10 in the image forming apparatus 10A will be described.

The image forming apparatus 10A has a configuration in which the belt conveyor device 3 in the image forming apparatus 10 is replaced with a belt conveyor device 3A.

The belt conveyor device 3A includes a first drive mechanism 4*a* and a second drive mechanism 4*b* instead of the roller drive mechanism 4.

In the belt conveyor device 3A, the plurality of support rollers 32 include a first drive roller 32*a* driven by the first drive mechanism 4*a* and a second drive roller 32*b* driven by the second drive mechanism 4*b*.

The first drive roller 32*a* is disposed downstream of the flat conveying area A1 in the belt conveying direction D1. The second drive roller 32*b* is disposed downstream of the first drive roller 32*a* in the belt rotation direction R1 and upstream of the flat conveying area A1 in the belt rotation direction R1.

The first drive mechanism 4*a* includes the first motor 41 and a first transmission mechanism 48*a*. The first transmission mechanism 48*a* transmits the rotational force of the first motor 41 to the first drive roller 32*a*. That is, the first motor 41 rotates the first drive roller 32*a*.

The second drive mechanism 4*b* includes the second motor 42 and a second transmission mechanism 48*b*. The second transmission mechanism 48*b* transmits the rotational force of the second motor 42 to the second drive roller 32*b*. That is, the second motor 42 rotates the second drive roller 32*b*.

The second transmission mechanism 48*b* transmits the rotational force at a greater reduction ratio than the first transmission mechanism 48*a*. When the present embodiment is employed, the same effect as that when the first embodiment is employed can be obtained.

In addition, in the present embodiment, the second drive roller 32*b* lessens changes in the tension applied to the conveyor belt 31 in the flat conveying area A1. This avoids instability in the conveyance of the sheet 9 due to the expansion and contraction of the conveyor belt 31.

First Application Example

Next, a first application example of the belt conveyor devices 3 and 3A will be described. In the present application example, the power supplied to the suction fan 34 when the sheet 9 is conveyed is controlled to be constant.

In the present application example, the second control portion 8*e* sets the second duty ratio RM2 based on the conveyed sheet area S1 and one preset power control data DT1. When the present application example is employed, the same effect as that when the first embodiment is employed can be obtained.

Second Application Example

Next, a second application example of the belt conveyor devices 3 and 3A will be described.

In the belt conveyor devices 3 and 3A, the second motor 42 may become a load for the first motor 41.

For example, when the first duty ratio RM1 set by the speed feedback control is large and the second duty ratio RM2 set based on the conveyed sheet area S1 is small, the second motor 42 becomes a load for the first motor 41.

When the second motor 42 is a load for the first motor 41, several problems arise. One of the problems is that the first motor 41 wastes power. Another problem is that the control of the rotational speed of the conveyor belt 31 becomes unstable.

In the present application example, the second control portion 8*e* stops the supply of power to the second motor 42 when the first duty ratio RM1 and the conveyed sheet area S1 satisfy a predetermined motor load condition.

The motor load condition is a condition representing a state in which the second motor 42 is a load for the first motor 41. For example, the motor load condition is any one of a first condition, a second condition, and a third condition.

The first condition is a condition that a difference between the first duty ratio RM1 and the second duty ratio RM2 set based on the conveyed sheet area S1 exceeds a preset tolerance.

The second condition is a condition that the first duty ratio RM1 exceeds a preset duty ratio upper limit value and that the second duty ratio RM2 set based on the conveyed sheet area S1 is below a preset duty ratio lower limit value.

The third condition is a condition that the first duty ratio RM1 exceeds a preset duty ratio upper limit value and that the conveyed sheet area S1 is below a preset area lower limit value.

In the present application example, when the motor load condition is satisfied, the supply of power to the second motor 42 is stopped. This eliminates the above-mentioned problems caused by the second motor 42 being a load for the first motor 41.

Third Application Example

The belt conveyor device 3 may be applied to convey an object other than the sheet 9, such as a plate material.

Fourth Application Example

The second control portion 8*e* may use information other than the conveyance information and the fan duty ratio RF1 to control the second duty ratio RM2.

In the present application example, the second control portion 8*e* acquires a motor power actual value and a speed actual value as information on the load torque. The motor power actual value is an actual value of the power consumption of the first motor 41 and the second motor 42. The speed actual value is an actual value of the speed detection value SP1.

For example, it is conceivable that the belt conveyor device 3 includes a current measurement circuit that measures the currents flowing through the first motor 41 and the second motor 42. In this case, the measured value of the current measurement circuit represents the motor power actual value.

When the rotational speed of the conveyor belt 31 is controlled to be constant, the larger the load torque, the larger the total power consumption of the first motor 41 and the second motor 42. In addition, when the total power consumption of the first motor 41 and the second motor 42 is constant, the larger the load torque, the slower the rotational speed of the conveyor belt 31.

In the present application example, the second control portion 8*e* derives a load torque index value by applying the motor power actual value and the speed actual value to a predetermined calculation formula. Further, the second control portion 8*e* sets the second duty ratio RM2 based on the derived load torque index value.

When the present application example is employed, the same effect as that of the belt conveyor devices 3 and 3A can be obtained.

APPENDIXES TO DISCLOSURE

The following are appendixes to the overview of the disclosure extracted from the above embodiments. It is noted that the structures and processing functions to be described in the following appendixes can be selected and combined arbitrarily.

Appendix 1

A belt conveyor device comprising:

an endless belt member which is ventilatable, disposed such that a part of the belt member is along a specific area, and configured to convey one or more objects along the specific area by rotating;

a plurality of support rollers configured to rotatably support the belt member;

a belt support which is ventilatable and disposed along an inner surface of the part of the belt member which is along the specific area;

a suction fan configured to generate a suction pressure for sucking the objects to an outer surface of the part of the belt member which is along the specific region;

a first motor configured to rotate one of the plurality of support rollers;

a second motor configured to rotate one of the plurality of support rollers;

a normal control portion configured to control a first supply power supplied to the first motor and a second supply power supplied to the second motor in a normal mode; and a calibration control portion configured to control the second supply power in a calibration mode, wherein the normal control portion acquires a speed detection value which is a detection value of a rotational speed of one of the plurality of support rollers, and controls the first supply power in accordance with a difference between the acquired speed detection value and a target speed, the normal control portion derives a load index value based on information on a load torque of the plurality of support rollers, and controls the second supply power based on power control data representing a correspondence between the load index value and a motor supply power, the calibration control portion executes a test drive control for causing the second motor and the suction fan to perform predetermined operations, and the calibration control portion corrects the power control data by comparing the speed detection value when the test drive control is being executed or a test actual value which is a power supplied to the second motor with a preset reference value.

Appendix 2

The belt conveyor device according to Appendix 1, wherein the calibration control portion executes, as the test drive control, a control for supplying a constant power to each of the second motor and the suction fan, and the calibration control portion uses, as the test actual value, the speed detection value when the test drive control is being executed.

Appendix 3

The belt conveyor device according to Appendix 1, wherein the calibration control portion executes, as the test drive control, a control for adjusting the second supply power in accordance with a difference between the speed detection value and a reference speed while supplying a constant power to the suction fan, and the calibration control portion uses, as the test actual value, a power supplied to the second motor when the difference between the speed detection value and the reference speed is within an allowable range by the test drive control.

Appendix 4

The belt conveyor device according to any one of Appendix 1 to Appendix 3, wherein the second control portion acquires, as the information on the load torque, conveyance information on a conveyance status of the objects in the specific area and suction force information on a suction force of the suction fan, the second control portion derives, as the load index value, a total area occupied by the objects in the specific area based on the conveyance information, and the second control portion selects target control data corresponding to the suction force information from a plurality of candidates of the power control data each representing a correspondence between the total area and the second supply power, and controls the second supply power based on the total area and the target control data.

Appendix 5

The belt conveyor device according to any one of Appendix 1 to Appendix 4, further comprising:

a relay rotary body rotatably supported;

a first input mechanism configured to transmit a rotational force of the first motor to the relay rotary body;

a second input mechanism configured to transmit a rotational force of the second motor to the relay rotary body; and an output mechanism configured to transmit a rotational force of the relay rotary body to an output rotary body connected to a drive roller which is one of the plurality of support rollers.

Appendix 6

The belt conveyor device according to any one of Appendix 1 to Appendix 4, wherein the plurality of support rollers include:

a first drive roller disposed downstream of the specific area in a moving direction of the conveyor belt in the specific area; and a second drive roller disposed downstream of the first drive roller in a rotation direction of the conveyor belt and upstream of the specific area in the rotation direction of the conveyor belt, the first motor rotates the first drive roller, and the second motor rotates the second drive roller.

Appendix 7

An image forming apparatus comprising:

the belt conveyor device according to any one of Appendix 1 to Appendix 6; and a printing device configured to form an image on a sheet conveyed by the belt conveyor device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A belt conveyor device comprising:

an endless belt member which is ventilatable, disposed such that a part of the belt member is along a specific area, and configured to convey one or more objects along the specific area by rotating;

a plurality of support rollers configured to rotatably support the belt member;

a belt support which is ventilatable and disposed along an inner surface of the part of the belt member which is along the specific area;

a suction fan configured to generate a suction pressure for sucking the objects to an outer surface of the part of the belt member which is along the specific area;

a first motor configured to rotate one of the plurality of support rollers;

a second motor configured to rotate one of the plurality of support rollers;

a first control portion configured to acquire a speed detection value which is a detection value of a rotational speed of one of the plurality of support rollers, and control a first supply power supplied to the first motor in accordance with a difference between the speed detection value and a target speed; and a second control portion configured to control a second supply power supplied to the second motor in accordance with one or both of conveyance information on a conveyance state of the objects in the specific area and suction force information on a suction force of the suction fan, wherein the second control portion derives a total area occupied by the objects in the specific area based on the conveyance information, and controls the second supply power in accordance with the total area.

2. The belt conveyor device according to claim 1, wherein the second control portion selects target control data corresponding to the suction force information from a plurality of candidates of power control data each representing a correspondence between the total area and the second supply power, and controls the second supply power based on the total area and the target control data.

3. The belt conveyor device according to claim 1, wherein the second control portion stops power supply to the second motor when the first supply power and the total area satisfy a predetermined condition.

4. The belt conveyor device according to claim 1, further comprising:

a relay rotary body rotatably supported;

a first input mechanism configured to transmit a rotational force of the first motor to the relay rotary body;

a second input mechanism configured to transmit a rotational force of the second motor to the relay rotary body; and an output mechanism configured to transmit a rotational force of the relay rotary body to an output rotary body connected to a drive roller which is one of the plurality of support rollers.

5. An image forming apparatus comprising:

the belt conveyor device according to claim 1; and a printing device configured to form an image on a sheet conveyed by the belt conveyor device.

* * * * *